United States Patent
Van De Hee et al.

(10) Patent No.: US 9,505,183 B2
(45) Date of Patent: Nov. 29, 2016

(54) PROCESS FOR COMBINED ROLLING AND STRETCHING OF TAPES

(75) Inventors: Hendrik Van De Hee, Ede (NL); Dennis Wilbers, Arnhem (NL)

(73) Assignee: TEIJIN ARAMID B.V., Arnhem (NL)

( * ) Notice: Subject to any disclaimer, the term of this patent is extended or adjusted under 35 U.S.C. 154(b) by 476 days.

(21) Appl. No.: 14/116,507

(22) PCT Filed: May 8, 2012

(86) PCT No.: PCT/EP2012/058439
§ 371 (c)(1),
(2), (4) Date: Nov. 8, 2013

(87) PCT Pub. No.: WO2012/152786
PCT Pub. Date: Nov. 15, 2012

(65) Prior Publication Data
US 2014/0070449 A1    Mar. 13, 2014

(30) Foreign Application Priority Data
May 11, 2011 (EP) .................................... 11165637

(51) Int. Cl.
*B29D 7/01* (2006.01)
*B29C 55/06* (2006.01)
*B29C 55/18* (2006.01)
*B29K 23/00* (2006.01)

(52) U.S. Cl.
CPC ................ *B29D 7/01* (2013.01); *B29C 55/06* (2013.01); *B29C 55/18* (2013.01); *B29K 2023/0683* (2013.01)

(58) Field of Classification Search
CPC ........ B29C 55/06; B29C 55/18; B29C 55/30
See application file for complete search history.

(56) References Cited

U.S. PATENT DOCUMENTS

2005/0218552 A1    10/2005  Van Erden et al.
2008/0251960 A1 *  10/2008  Harding ................ B29C 43/228
                                                264/119

FOREIGN PATENT DOCUMENTS

EP        0 591 757 A1       4/1994
JP        A-53-4077          1/1978
WO        WO 2008/127562 A1  10/2008

OTHER PUBLICATIONS

International Search Report issued in International Application No. PCT/EP2012/058439 dated Jun. 29, 2012.
Written Opinion of the International Searching Authority issued in International Application No. PCT/EP2012/058439 dated Jun. 29, 2012.
International Preliminary Report on Patentability issued in International Application No. PCT/EP2012/058439 dated Oct. 21, 2013.

* cited by examiner

*Primary Examiner* — Stella Yi
(74) *Attorney, Agent, or Firm* — Oliff PLC

(57) ABSTRACT

A process for rolling and stretching of a sheet into a tape is provided. A sheet may be rolled into a rolled sheet in the nip between two rolls of the calender and the rolled sheet is stretched immediately thereafter into a tape on the surface of one of the two calender rolls. The speed of the rolled sheet on the surface of the calender roll may be higher than the speed of the calender roll. The position of the start of the neck-down of the rolled sheet and the rate of neck-down can be easily controlled by the proposed process.

19 Claims, 2 Drawing Sheets

PROCESS FOR COMBINED ROLLING AND STRETCHING OF TAPES

TECHNICAL FIELD OF INVENTION

The present disclosure pertains to a process for combined rolling and stretching of a sheet into a tape on a calender. Furthermore, the present disclosure pertains to tapes having improved properties.

BACKGROUND

In the manufacture of tapes, one of the used methods is to roll a sheet material in the nip of a calender and subsequently stretching the rolled sheet in one or more separate stretching stages, wherein the rolled sheet material is elongated in air between two sets of rollers, as for example disclosed in WO 2008/127562. During stretching the sheet material is reduced in width and in thickness. The reduction in width of a rolled sheet during stretching is called necking or neckdown. The reduction in width of the sheet material in air between the two sets of rollers is generally characterised by a very rapid neck-down, i.e. the width of the sheet material is reduced strongly over a very limited distance.

A rapid neck-down can result in differences in stretching behaviour over the width of the sheet material as the deformation rate of the sheet material can, for example, increase from the center to the outer edges of the sheet material. A rapid neck-down can also lead to differences in polymer orientation over the width of the stretched tape.

The differences in stretching behaviour over the width of the neck can cause thickness variations over the width of the resulting stretched tape. Furthermore, the stretched tape may exhibit stress differences when being strained, which in turn can cause the formation of unwanted wrinkles in the tape. These detrimental effects become more problematic with increasing width of the rolled sheet material.

The rolled sheet can also be stretched over one or more convex plates. The position of the start of the neck-down can vary in time in prior art processes resulting in varying mechanical properties in time and thus over the length of the manufactured tape.

SUMMARY

The process according to the present disclosure combines rolling and stretching of a sheet into a tape on a calender. The sheet is rolled into a rolled sheet in the nip between two rolls of the calender and the rolled sheet is stretched immediately thereafter into a tape on the surface of one of the two calender rolls. The speed of the rolled sheet on the surface of the calender roll is higher than the speed of the calender roll. The position of the start of the neck-down of the rolled sheet and the rate of neck-down can be controlled by the proposed process.

DETAILED DESCRIPTION OF EMBODIMENTS

An embodiment pertains to a process for rolling and stretching a sheet into a tape characterised in that the sheet is rolled into a rolled sheet in the nip between two rolls of a calender and that the rolled sheet is stretched into a tape on the surface of one of the two calender rolls. The rolled sheet is thus in contact with the surface of the calender roll during stretching of the rolled sheet into a tape.

Combining rolling of a sheet with stretching of the rolled sheet on a single piece of equipment, i.e. the calender, enables more economic production of tapes.

In embodiments, the process disclosed herein enables a more stable production of stretched tape from a sheet as the initial stretching of the tape can be better controlled. The stretched tape has a more homogeneous thickness and/or more homogeneous mechanical properties over the width and/or length of the stretched tape, which makes the process of stretching the tape further in one or more subsequent stretching stages less sensitive.

In many tape-manufacturing processes the tape is stretched in a series of subsequent stretching stages, wherein the processing conditions, such as for example tensions and temperatures, of each stretching step have to be controlled very carefully. Integrating two or more stretching stages has been found to be very difficult, as a small deviation in a first section of such an integrated stretching stage can lead to major quality issues in a second section of the integrated stretching stage due to inhomogeneities in the tape. In embodiments, the process of the present disclosure provides a stretched tape having improved homogeneity after stretching the rolled sheet on the surface of the calender roll, which allows for the integration of two or more additional stretching stages.

Rolling as used herein has to be understood to mean increasing the length of the sheet, also known as elongating the sheet, by reducing the thickness of the sheet, but without significantly reducing the width of the sheet. There may be some edge effects, due to, for example, bulging of the sheet under compressive force in the nip of the calender, but these edge effects are insignificant compared to the width of the sheet and are limited to about 20 times the thickness of the rolled sheet.

The tapes manufactured by the process according to the present disclosure exhibit a more homogeneous thickness and/or more homogeneous mechanical properties over the width of the stretched tapes. The edges, affected by the edge effects described above, are cut off from the stretched tape and are not taken into account when considering the homogeneity of the stretched tape.

Stretching, also known as drawing, as used herein has to be understood to mean increasing the length of the sheet by reducing both the width of the sheet and the thickness of the sheet.

Figure 1:
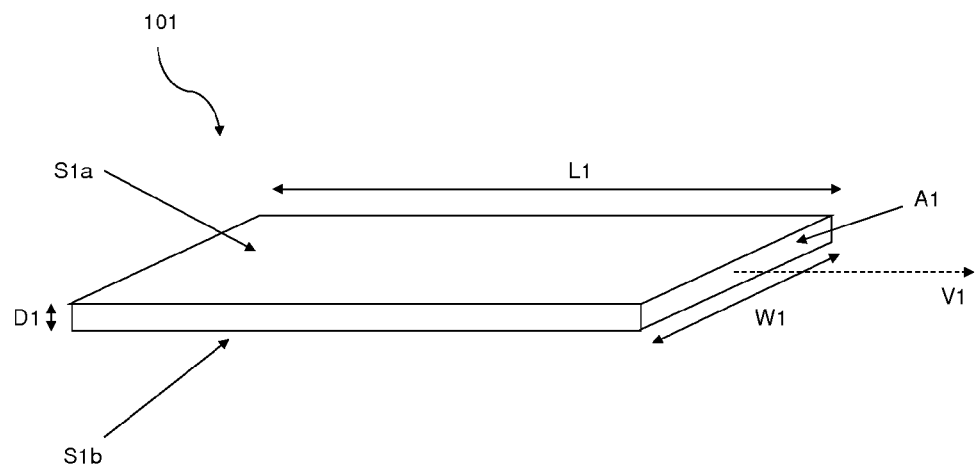
FIG. 1 is a schematic representation of a sheet.

The sheet (101) as shown in FIG. 1 is a material having three dimensions, a length (L1), a width (W1) and a thickness (D1). The sheet has two main surface sides, S1a and S1b, each of the two main surfaces sides being defined by the length L1 and the width W1 of the sheet. The sheet also has a cross sectional area (A1) being defined by the width W1 and thickness D1 of the sheet. The sheet moves at a speed V1 in the production direction, which is in parallel to the direction of dimension L1, into the nip between the two rolls of the calender.

The length L1 of the sheet is the dimension of the sheet in the production direction of the sheet, also known as machine direction, and can be indefinite in case of continuous production. In general the length L1 is at least 0.5 m. The width W1 of the sheet is defined as being the dimension of the sheet perpendicular to the production direction in the plane of movement of the sheet, also known as the cross machine direction. In general, the width W1 of the sheet is in the range of 0.1 to 5.0 m, preferably in the range of 0.2 to 1.5 m. The thickness D1 of the sheet is defined as being the dimension of the sheet perpendicular to the production direction and perpendicular to the cross machine direction, and is also known as the normal direction. In general, the thickness of the sheet is in the range of 0.5 to 10 mm, preferably in the range of 1.0 to 4.0 mm, even more preferably in the range of 1.5 to 3.0 mm.

The sheet can be made of any stretchable material. Preferably, the sheet is made of a polymer or a blend of polymers, such as polyesters, for example polyethylene terephthalate, polyolefins, for example polyethylene or polypropylene, polyamides, polycarbonates or any blend thereof.

Preferably, the polymer of which the sheet is made is a polyolefin or a blend of polyolefins. More preferably the sheet is made of polyethylene, even more preferably of UHMWPE. Most preferably the sheet is made of compression moulded UHMWPE powder or of sintered UHMWPE powder.

Preferably, the UHMWPE has an average molecular weight, Mw, of at least 400.000 g/mole, more preferably between 500.000 and 10.000.000 g/mole, a low entanglement density and a polydispersity, Mw/Mn, of less than 10, more preferably less than 8, most preferably less than 6.

Figure 2:
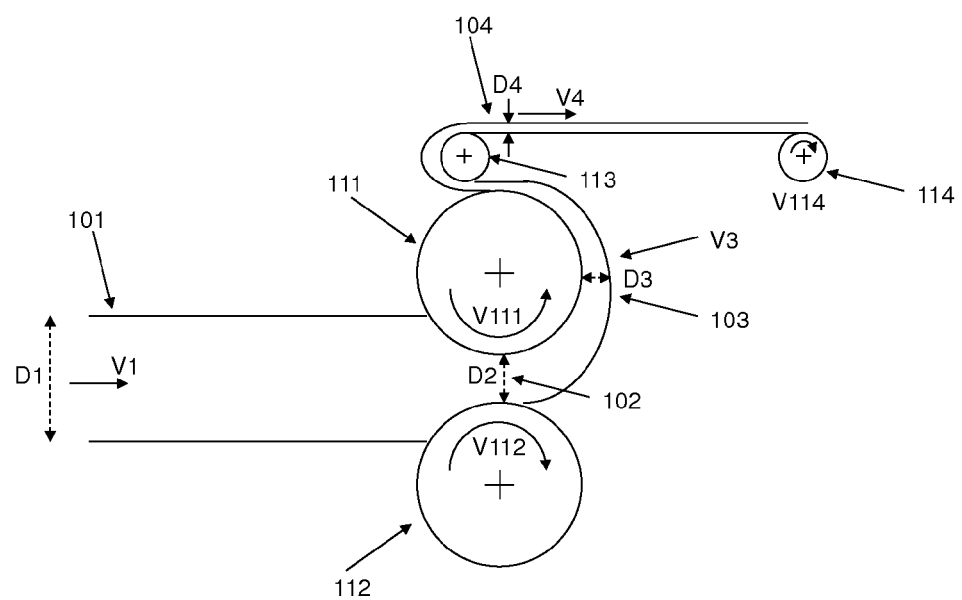
FIG. 2 is a schematic representation of an embodiment of the invention wherein a sheet is rolled and stretched into a tape on a calender.

The sheet (101) is rolled in the nip between the two rolls of a calender into a rolled sheet (102) by reducing the thickness of the sheet (101) as is schematically shown in FIG. 2. In the nip of the two rolls (111, 112) of the calender a force is applied on the two main surfaces of the sheet (101) in the normal direction to compress the sheet in its thickness direction. As at least one of the rolls (111) of the calender rotates at a higher linear circumferential speed (V111) than the speed (V1) of the sheet, the sheet (101) is elongated in the machine direction by shear and compression stresses applied to the sheet (101) by the calender rolls (111, 112).

The rolled sheet (102) exiting the nip between the two rollers (111, 112) of the calender is a material having also three dimensions, a length (L2, not shown), a width (W2, not shown) and a thickness (D2). The rolled sheet (102) has a cross sectional area (A2, not shown) being defined by the width W2 and thickness D2 of the rolled sheet (102).

During rolling of the sheet (101) in the nip between the two rolls (111, 112) of the calender, the width of the sheet is essentially maintained at its original width, which means that the rolled sheet (102) has a width W2, which is essentially the same as the width W1 of the original sheet (101).

The rolled sheet (102) has a reduced thickness D2 as compared to the thickness D1 of the original sheet (101). Preferably, the thickness-ratio, RD12, of the thickness D1 of the original sheet (101) over the thickness D2 of the rolled sheet (102) is at least 3, more preferably at least 4, even more preferably at least 5.

The rolled sheet (102) has an increased length L2 as compared to the length L1 of the original sheet (101). Preferably, the length-ratio, RL21, of the length L2 of the rolled sheet (102) over the length L1 of the original sheet (101) is at least 3, more preferably at least 4, even more preferably at least 5.

During rolling the density of the sheet (ρ1, not shown) may be increased due to the compression (normal) forces applied on the two main surfaces (S1a, S1b) of the sheet in the nip between the two rollers (111, 112) of the calender. When the density (ρ2) of the rolled sheet (102) has been increased as compared to the density ρ1 of the original sheet (101), the length-ratio RL21 will be smaller than the thickness-ratio RD12. When a sheet of compression moulded UHMWPE or a sheet of sintered UHMWPE powder is used, the increase in density during rolling will preferably be 5% or less, more preferably 2% or less. The increase in density during rolling will be 1% or less if a high quality sheet of compression moulded UHMWPE or a high quality sheet of sintered UHMWPE powder sheet is used. The length-ratio RL21 will be smaller by 5% or less, preferably by 2% or less, more preferably by 1% or less than the thickness-ratio RD12, when the width W2 of the rolled sheet is equal to the width W1 of the sheet.

Alternatively, when the density ρ2 of the rolled sheet (102) has not been increased during rolling, and is thus equal to the density ρ1 of the sheet (101), the length-ratio RL21 will be equal to the thickness-ratio RD12, when the width W2 of the rolled sheet is equal to the width W1 of the sheet.

Subsequent to rolling of the sheet (101) into a rolled sheet (102) in the nip between the two rollers (111, 112) of the calender, the rolled sheet (102) is stretched on the surface of one of the two rolls (111) of the calender. The speed (V3) of the rolled sheet being stretched into a tape (103) on the surface of the calender roll (111) is higher than the speed (V111) of the calender roll (111) on whose surface the rolled sheet is being stretched. The speed (V3) of the rolled sheet being stretched into a tape (103) on the surface of the calender roll (111) increases gradually from the speed V2 at the nip between the rollers (111, 112) of the calender to a speed V4 at the point where the stretched tape is taken off from the surface of the calender roll (111) by a take off roller.

The speed (V4) at which the stretched tape is taken off from the surface of the calender roll by take off roller 113 is defined by a speed-controlled roll 114. Alternatively, take off roller 113 may be a speed controlled roll having a speed V113 (not shown). As the linear circumferential speed (V113 or V114) of the speed-controlled roll (113 or 114) is higher than the speed (V111) of the calender roll (111) on whose surface the rolled sheet (103) is being stretched, the rolled sheet is elongated by tensile forces when the tensile force exceeds the friction force between the rolled sheet being stretched into a tape and the surface of the calender roll.

The rolled sheet 102 exiting the nip of the calender has a low resistance against stretching by tensile forces as the rolled sheet is preferably heated to a temperature close to the melting temperature of the sheet. The material of the rolled sheet has been subjected only to a limited degree of orientation. As the rolled sheet is being stretched on the surface of the calender, the material of the sheet will gradually become more oriented from the nip of the calender to the take off roller, thereby increasing the modulus of the rolled sheet being stretched on the surface of the calender roll. The resistance against stretching increases, thereby gradually increasing the tensile forces on the rolled sheet being stretched.

The stretched tape (104) taken off from the surface of the calender roll (111) is a material having also three dimensions, a length (L4, not shown), a width (W4, not shown) and a thickness (D4).

The stretched tape (104) has a reduced width W4 as compared to the width W2 of the rolled sheet (102) and has a reduced thickness D4 as compared to the thickness D2 of the rolled sheet (102). The stretched tape (104) has a cross sectional area (A4, not shown) being defined by the width W4 and thickness D4 of the tape (104). Generally, the ratio of the width over the thickness of the stretched tape (104) is almost equal to the ratio of the width over the thickness of the rolled sheet (102).

Preferably, the area-ratio, RA24, of the cross sectional area A2 of the rolled sheet (102) over the cross sectional area A4 of the stretched tape (104) is at least 2, more preferably at least 3, most preferably at least 4.

The stretched tape (104) has an increased length L4 as compared to the length L2 of the rolled sheet (102). Preferably, the length-ratio RL42 of the length L4 of the stretched tape (104) over the length L2 of the rolled sheet (102) is at least 2, more preferably at least 3, most preferably at least 4.

The start of the neck-down of the rolled sheet (102) has a fixed point on the surface of the calender roll, which is located at the exit of the nip of the calender rolls (111, 112). When a rolled sheet is stretched in (hot) air between two sets of rollers or on the surface of a convex plate, the position of the start of the neck-down can vary in time, for example due to inhomogeneities contained in the sheet, such as inhomogeneities in density or thickness over the length of the sheet, and as a result the mechanical properties of the tape can vary in time. As the position of the start of the neck-down is fixed at the exit of the nip of the calender, the mechanical properties of the tape will not vary in time due to a changing position of the start of the neck-down.

In embodiments, the rate of neck-down of the rolled sheet during stretching can be controlled. A gradual neck-down of the rolled sheet during stretching can be achieved as the friction between the rolled sheet being stretched into a tape and the surface of the calender roll prevents a rapid neck-down of the rolled sheet. The tensile force applied to the rolled sheet being stretched on the surface of the calender roll increases gradually along the circumference of the calender roll from the nip of the calender to the point where the stretched tape is being taken off from the surface of the calender roll.

Figure 3:
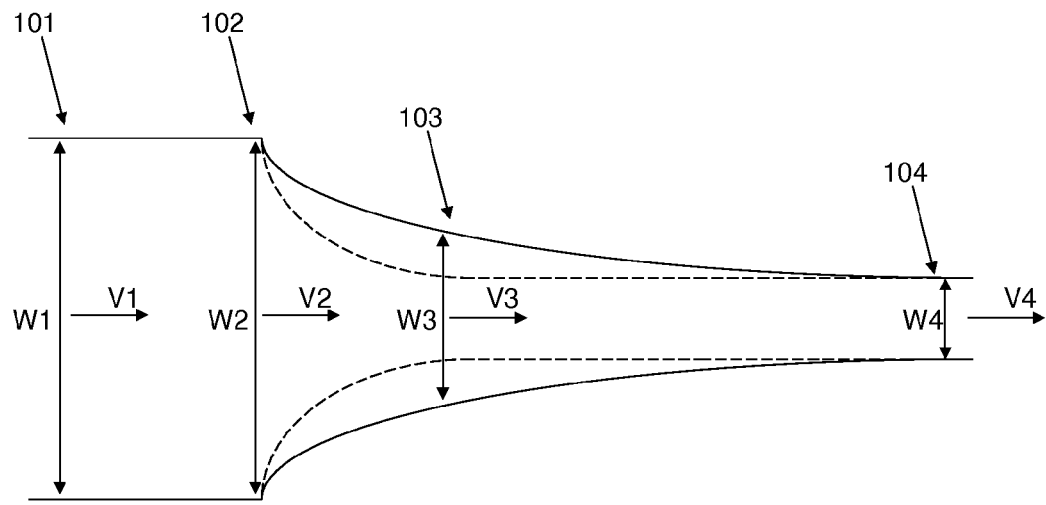
FIG. 3 is a schematic representation of the neck-down of a rolled sheet being stretched into a tape.

The rolled sheet is gradually reduced in width and in thickness on the surface of the calender roll as shown in FIG. 2 and FIG. 3. At the same time the speed V3 of the rolled sheet is gradually increased on the surface of the calender roll along the circumference of the calender roll from the nip of the calender to the point where the stretched tape is being taken off from the surface of the calender roll. The rolled sheet is thus stretched into a tape along a section of the circumference of one of the two rolls of the calender. The rolled sheet in the process of being stretched into a tape (103) has for example a width W3 and thickness D3 at a point located between the nip of the calender and the take off point at roller 113. The width W3 and thickness D3 are reduced as compared to the width W2 and thickness D2 of the rolled sheet (102), but are still larger than width W4 and thickness D4 of the stretched tape (104) taken off from the surface of the calender roll. The speed V3 of the rolled sheet being stretched (103) is increased as compared to the speed V2 of the rolled sheet (102), but is still lower than the speed V4 of the stretched tape (104) taken off from the surface of the calender roll (111). The controlled reduction in width and thickness of the rolled sheet ensures that the speed V3 of the rolled sheet being stretched exhibits less variations over the width W3 of the rolled sheet being stretched (103). The dashed lines in FIG. 3 show schematically the rapid neck-down in prior art stretching processes between two sets of rollers as often used in stretching tapes.

Preferably the neck-down is as gradual as possible and extends from the nip of the calender to the take off point at roller 113 to minimize differences over the width of the tape, for example in thickness of the tape and/or the polymer orientation in the tape.

The friction force between the rolled sheet being stretched into a tape and the surface of the calender roll can be adjusted to control the rate of neck-down of the rolled sheet.

The coefficient of friction of the surface of the calender roll can be adjusted by changing the roughness and/or the material to match the friction force between the rolled sheet being stretched into a tape and the surface of the calender roll to the distance available for neck-down along the circumference of the calender roll.

Figure 4:
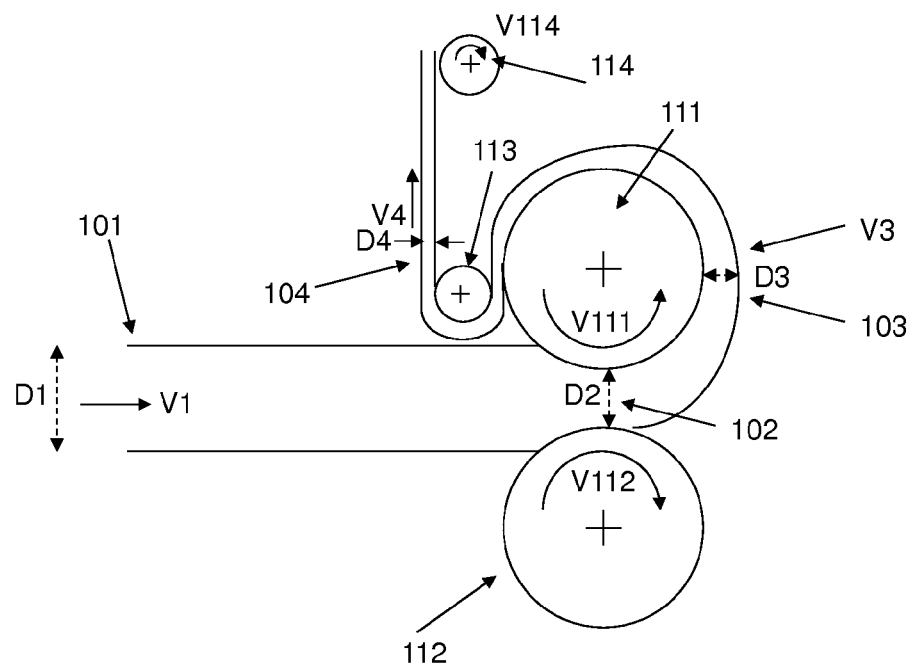
FIG. 4 is a schematic representation of another embodiment of the invention wherein a sheet is rolled and stretched into a tape on a calender.

The distance available for neck-down of the rolled sheet being stretched on the surface of the calender roll can be adjusted by varying the position of the take off roller 113 as schematically shown in FIG. 4. The distance available for neck-down of the rolled sheet being stretched on the surface of the calender in the embodiment of FIG. 4 has, for example, been increased to about 75% of the circumference of the calender roll 111 as compared to about 50% of the circumference of the calender roll 111 in the embodiment of FIG. 2 by changing the position of take off roller 113.

Alternatively, the distance available for neck-down of the rolled sheet being stretched on the surface of the calender roll can be increased by increasing the diameter of the calender roll on whose surface the rolled sheet is being stretched.

When the diameter of the calender roll is increased, the normal force pressing the rolled sheet onto the surface of the calender roll is decreased thus reducing the friction force per unit length between the rolled sheet and the calender roll. The total length available for the neck-down of the rolled sheet being stretched is increased by increasing the diameter of the roll and the neck-down can proceed more gradually, thus reducing the deformation rate of the material of the rolled sheet. The tensile force applied on the rolled sheet being stretched will increase also more gradually.

Preferably, the sheet is pre-heated before entering the nip between the two rolls of the calender.

One or both calender rolls may be heated to increase the temperature of the sheet to a temperature just below the melting temperature of the sheet. Preferably, the temperature of the sheet during rolling in the nip of the calender is in the range of 1 to 20° C., more preferably in the range of 2 to 10° C., below the melting temperature of the sheet.

When the sheet comprises, besides the major component, a small fraction of lower melting or higher melting material, of about 5% by weight of the total sheet or less, the melting temperature of the sheet has to be understood to mean the melting temperature of the major component. When the sheet comprises a blend of different types of polymers or a blend of polymers of the same type having different molecular weight distributions, the melting temperature of the sheet has to be understood to mean the melting temperature of the higher melting polymer of the blend. Of course, also the blend of polymers may contain a small fraction of lower melting or higher melting material.

In a preferred embodiment the sheet is made of compression moulded UHMWPE powder or of sintered UHMWPE powder. Preferably, the compression moulded or sintered UHMWPE sheet is pre-heated to a temperature of 130 to 140° C. before entering the nip of the calender and one or both calender rolls may be heated to raise the temperature of the UHMWPE sheet.

Alternatively, one or both calender rolls may be cooled to remove heat from the sheet being rolled in the nip of the calender and/or from the rolled sheet being stretched on the surface of the calender roll. Rolling and stretching of the sheet can generate a considerable amount of heat, which has to be removed from the sheet to prevent that the temperature of the sheet rises to above its melting temperature.

The heat generated during stretching of the rolled sheet into a tape in air between two sets of rollers, as performed in prior art processes, can result in locally different heating of the sheet, which may result in that the sheet exhibits different stretching behaviour locally. The rolled sheet being stretched into a tape on the surface of the calender roll will be pressed onto the curved surface of the calender roll by normal forces, which ensures good contact between the rolled sheet being stretched and the surface of the calender roll. The heat generated by rolling and stretching can thus be removed from the sheet effectively and as a result the temperature of the rolled sheet being stretched is controlled to be below its melting temperature. As the modulus of the rolled sheet being stretched is not reduced by a too high temperature of the rolled sheet being stretched, the neck-down of the rolled sheet can be controlled to be as gradual as desired to obtain tapes having improved homogeneity.

In a further embodiment, the temperature of the two rolls of the calender may be controlled, either by heating or by cooling, at different temperatures to further optimize the process. In the nip of the calender the allowable temperature of the sheet being rolled is limited by the melting temperature of the material of the rolled sheet, which has been subjected only to a limited degree of orientation. When the rolled sheet is being stretched on the surface of the calender roll 111, the orientation in the rolled sheet being stretched is gradually increased, which can cause an increase in melting temperature of the sheet material. A higher temperature of calender roll 111 can be advantageous to optimize the stretching process on the surface of the calender roll. The temperature of calender roll 111 may thus be controlled at a higher temperature than calender roll 112. The temperature of calender roll 112 can be controlled at a lower temperature than calender roll 111 to ensure that the temperature of the sheet in the nip does not exceed the melting temperature of the sheet being rolled.

To prevent a reduction of the temperature of the main surface side, which is not in direct contact with the surface of the calender roll during stretching of the rolled sheet, due to energy exchange with surrounding air, this main surface side of the rolled sheet being stretched may be insulated from the surrounding air, for example by heat reflecting shielding. The complete calender may even be located in a temperature-controlled room.

Alternatively, the main surface side, which is not in direct contact with the surface of the calender roll, may be heated by any known means, such as by blowing hot air or by infrared radiation.

When heating the main surface side, which is not in direct contact with the surface of the calender roll, heating may be performed by multiple heating elements, placed side-by-side across the width of the rolled sheet being stretched. The different heating elements can be used to supply different heat-fluxes over the width of the rolled sheet being stretched to optimize the stretching behaviour of the rolled sheet being stretched. For example, the heat-flux to the rolled sheet being stretched may be increased at the edges of the sheet to compensate for higher energy exchange with surrounding air at the edges. Preferably, heating is performed by at least 2, more preferably at least 5, heating elements.

The two rolls of the calender defining the nip where the sheet is rolled into a rolled sheet may have different diameters, for example to further optimize the temperature of the sheet in the nip. A larger diameter of the roll enables a better control of the temperature of the roll as the ratio of the heat flux from the sheet to the roll or from the roll to the sheet and the heat capacity of the roll is reduced. Increase or reduction of the temperature of the calender roll due to variations in heat flux will thus be reduced.

In an embodiment, the two rolls of the calender rotate in opposite rotational directions to ensure easy entry of the sheet into the nip of the calender, as in the nip of the calender the surfaces of both calender rolls move in the production direction of the sheet.

In another embodiment, the two rolls of the calender rotate in opposite rotational directions at the same linear circumferential speed. The shear stresses applied to the sheet by the calender rolls to elongate the sheet in the machine direction are then equal on both main surfaces S1a and S1b of the sheet. The rolled sheet can thus exhibit a symmetrical property profile over the thickness of the rolled sheet.

In yet another embodiment, the two rolls of the calender rotate in opposite rotational directions at different linear circumferential speeds. The differences in shear stresses over the thickness of the sheet can thus be minimized in order to minimize differences in stretching behaviour over the thickness of rolled sheet. One of the two calender rolls (111, 112) may even be stagnant to minimize the differences in orientation over the thickness of rolled sheet. The rolled sheet thus exhibits a more constant property profile over the thickness of the rolled sheet.

In a further embodiment, the two rolls of the calender rotate in the same rotational direction to ensure constant shear stress over the thickness of the sheet to be rolled in the nip of the calender. The rolled sheet thus exhibits constant properties over the thickness of the rolled sheet.

The stretched tape taken off from the surface of the calender roll by the take off roller having optimized homogeneity over the width and/or over the thickness of the tape may be stretched further in one or more additional drawing stages. Each of the additional drawing stages can be executed using any known drawing technique per se, such as for example drawing in (hot) air between two sets of rollers, drawing on the surface of a convex plate and the like. Each of the additional drawing stages may also be executed on the surface of a calender roll. The stretched tape may also be rolled further in the nip of the calender used to stretch the tape further. The tape may also be stretched further by any combination of these techniques.

As the tape taken off from the surface of the calender roll by the take off roller has improved homogeneity, for example in thickness and/or in polymer orientation and/or mechanical properties over the width and/or over the thickness of the tape, the further stretching of the tape in additional drawing stages will be less sensitive. In many processes the stretching of tapes is executed in a series of drawing stages, wherein the conditions, such as for example speed differences and temperature settings, in each drawing stage have to be carefully chosen to avoid for example breakage of the tape. As the tape taken off from the surface of the calender roll has improved homogeneity, some or all of the additional stretching stages may be integrated to reduce the total number of drawing stages.

In embodiments, the process of the present disclosure enables a more stable production of stretched tapes from a sheet as the initial stretching of the tape can be better controlled on the surface of a calender roll. The stretched tape has a more homogeneous thickness and/or more homogeneous mechanical properties over the width and/or over the thickness of stretched tape, which makes the process of stretching the tape further in one or more subsequent stretching stages less sensitive.

In many tape manufacturing processes the tape is stretched in a series of subsequent stretching stages, wherein the processing conditions, such as for example tensions and temperatures, of each stretching step have to be controlled very carefully. Integrating two or more stretching stages has been found very difficult, as a small deviation in a first section of such an integrated stretching stage can lead to major quality issues in a second section of the integrated stretching stage due to inhomogeneities in the tape. The process according to the present disclosure provides a stretched tape having improved homogeneity after stretching the rolled sheet on the surface of the calender roll, which allows for the integration of two or more additional stretching stages.

Stretched tapes are useful in many applications including ballistic applications, ropes, cables, nets and fabrics. Stretched tapes of UHMWPE are especially useful in ballistic applications and ropes.

What is claimed is:

1. A process for rolling and stretching a sheet into a tape wherein
the sheet is rolled into a rolled sheet in a nip between two rolls of a calender in such a way that a length of the sheet is increased and a thickness of the sheet is reduced without reducing a width of the sheet by an amount that is more than about 20 times the thickness of the rolled sheet, and
the rolled sheet is stretched into a tape while being in contact with a surface of one of the two rolls of the calender in such a way that the length of the rolled sheet is increased and both the width of the rolled sheet and the thickness of the rolled sheet are reduced.

2. The process according to claim 1, wherein the two rolls of the calender rotate in opposite directions.

3. The process according to claim 2, wherein the two rolls of the calender rotate at the same speed.

4. The process according to claim 2, wherein the two rolls of the calender rotate at different speeds.

5. The process according to claim 1, wherein the two rolls of the calender rotate in the same direction.

6. The process according to claim 1, wherein one or both of the calender rolls is/are temperature controlled.

7. The process according to claim 1, wherein one or both of the calender rolls is/are heated.

8. The process according to claim 1, wherein a ratio of the thickness of the sheet to the thickness of the rolled sheet is at least 3.

9. The process according to claim 1, wherein a ratio of the cross sectional area of the rolled sheet to the cross sectional area of the tape is at least 2.

10. The process according to claim 1, wherein the stretched tape is stretched further in one or more additional drawing stages.

11. The process according to claim 10, wherein the tape is further stretched in one or more convex plate drawing stages, in air in one or more drawing stages comprising two sets of rollers, on the surface of one or more calender rollers, or in any combination thereof.

12. The process according to claim 1, wherein the sheet is made of a polymer.

13. The process according to claim 12, wherein the sheet is made of a polyolefin or a blend of polyolefins.

14. The process according to claim 13, wherein the sheet is made of a polyethylene.

15. The process according to claim 14, wherein the sheet is made of an ultra-high molecular weight polyethylene.

16. The process according to claim 1, wherein the width of the sheet is in the range of 0.1 to 5.0 m, and the thickness of the sheet is in the range of 0.5 to 10 mm.

17. The process according to claim 16, wherein the length of the sheet is at least 0.5 m.

18. The process according to claim 8, wherein the width of the sheet is in the range of 0.1 to 5.0 m, and the thickness of the sheet is in the range of 0.5 to 10 mm.

19. The process according to claim 18, wherein the length of the sheet is at least 0.5 m.

* * * * *